United States Patent
Battle et al.

(10) Patent No.: US 11,144,319 B1
(45) Date of Patent: Oct. 12, 2021

(54) REDISTRIBUTION OF ARCHITECTED STATES FOR A PROCESSOR REGISTER FILE

(71) Applicant: International Business Machines Corporation, Armonk, NY (US)

(72) Inventors: Steven J. Battle, Philadelphia, PA (US); Susan E. Eisen, Round Rock, TX (US); Dung Q. Nguyen, Austin, TX (US); Salma Ayub, Austin, TX (US); Albert J. Van Norstrand, Jr., Round Rock, TX (US); Kent Li, Austin, TX (US); Kurt A. Feiste, Austin, TX (US); Christian Gerhard Zoellin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/940,433

(22) Filed: Jul. 28, 2020

(51) Int. Cl.
*G06F 9/30* (2018.01)
*G06F 9/38* (2018.01)
*G06F 16/17* (2019.01)

(52) U.S. Cl.
CPC ............ *G06F 9/3013* (2013.01); *G06F 9/384* (2013.01); *G06F 16/1724* (2019.01)

(58) Field of Classification Search
None
See application file for complete search history.

(56) References Cited

U.S. PATENT DOCUMENTS

| | | | | |
|---|---|---|---|---|
| 5,778,392 A | * | 7/1998 | Stockman | ............ G06F 3/0601 |
| 6,090,156 A | * | 7/2000 | MacLeod | ................ G06F 8/441 |
| | | | | 717/157 |
| 6,772,279 B1 | * | 8/2004 | Sun | ........................ G11C 15/00 |
| | | | | 707/999.006 |
| 8,930,647 B1 | | 1/2015 | Smith | |
| 9,292,431 B2 | | 3/2016 | Thatcher | |
| 9,679,040 B1 | * | 6/2017 | Davis | .................. G06F 16/1827 |
| 9,760,375 B2 | | 9/2017 | Boersma | |
| 2007/0074193 A1 | * | 3/2007 | Talyansky | ............. G06F 9/3004 |
| | | | | 717/148 |

(Continued)

FOREIGN PATENT DOCUMENTS

CN 110647497 A 1/2020

OTHER PUBLICATIONS

Panda,P.R. etal., Data and Memory Optimization Techniques for Embedded Systems, 2001, ACM, ACM transactions on Design Automation of Electronics Systems, vol. 6, No. 2, pp. 149-206. (Year: 2001).*

(Continued)

*Primary Examiner* — Eric Coleman
(74) *Attorney, Agent, or Firm* — Donald G. Weiss

(57) ABSTRACT

In an approach to dynamic redistribution of register files, whether a redistribution of register files is necessary is determined. Responsive to determining that the redistribution of register files is necessary, one or more register file transfers that have not yet completed are flushed. One or more register file write locations are allocated for each architected register based on a register free list. Source data is read from each architected register. The source data is written to the one or more register file write locations.

20 Claims, 5 Drawing Sheets

(56) References Cited

U.S. PATENT DOCUMENTS

| | | | | |
|---|---|---|---|---|
| 2011/0055471 | A1* | 3/2011 | Thatcher | G06F 3/0608 711/114 |
| 2012/0005461 | A1* | 1/2012 | Moir | G06F 9/3863 712/228 |
| 2014/0223101 | A1* | 8/2014 | Jackson | G06F 12/0875 711/125 |
| 2017/0337212 | A1* | 11/2017 | Hayasaka | G06F 3/067 |

OTHER PUBLICATIONS

Homayoun, H . . . etal., RELOCATE: Register File Local Access Pattern Redistribution Mechanism for Power and Thermal Management in Out-of Order Embedded Processor., 2010, Springer, High performance Embedded Architectures and Compilers HiPEAC 2010, pp. 216-231 of 370 pages. (Year: 2010).*

"Fast supplemental method to defragment physical memory in an operating system", IP.com Prior Art Database Technical Disclosure, Original Publication Date: Nov. 20, 2009, IP.com No. IPCOM000190209D, IP.com Electronic Publication Date: Nov. 20, 2009, 4 Pages.

Disclosed Anonymously, "Mapper recovery and millicode register deallocation", IP.com Prior Art Database Technical Disclosure, IP.com No. IPCOM000256698D, IP.com Electronic Publication Date: Dec. 20, 2018, 9 pages.

Disclosed Anonymously, "Using a common Error Correcting Special Purpose Register for correcting errors in a register file", IP.com Prior Art Database Technical Disclosure, IP.com No. IPCOM000202463D, IP.com Electronic Publication Date: Dec. 16, 2010, 3 Pages.

Bergner, et al., "Performance Optimization and Tuning Techniques for IBM Power Systems Processors Including IBM Power8", IBM Redbooks, International Business Machines Corporation, International Technical Support Organization, Second Edition, Aug. 2015, 274 Pages.

IBM, "Performance management", AIX Version 7.1, Copyright International Business Machines Corporation 2010, 2017, 448 Pages.

* cited by examiner

REDISTRIBUTION OF ARCHITECTED STATES FOR A PROCESSOR REGISTER FILE

BACKGROUND

The present invention relates generally to the field of computer processors, and more particularly to dynamic redistribution of register files.

Registers are temporary storage locations inside a processor core that hold data and addresses. A register file is an array of registers in a central processing unit (CPU). The instruction set architecture of a processor typically defines a set of registers which are used to stage data between memory and the functional units of the CPU, such as the execution unit. In simpler CPUs, these architectural registers correspond one-for-one to the entries in a physical register file within the CPU. More complicated CPUs use register renaming, so that the mapping of the physical register that stores a particular architectural register changes dynamically during execution. The register file is part of the processor microarchitecture and is visible to the programmer.

SUMMARY

Embodiments of the present invention disclose a method, a computer program product, and a system for dynamic redistribution of register files. In one embodiment, whether a redistribution of register files is necessary is determined. Responsive to determining that the redistribution of register files is necessary, one or more register file transfers that have not yet completed are flushed. One or more register file write locations are allocated for each architected register based on a register free list. Source data is read from each architected register. The source data is written to the one or more register file write locations.

DETAILED DESCRIPTION

Many CPUs today have a number of registers in blocks or files that can be assigned virtual register names during operation. Often the registers in these blocks or files are organized as a bank of n-bit registers that can hold either a single n-bit value or two ½n-bit values. During the course of operation, these registers are continuously being allocated and deallocated, as instructions are fetched, decoded, and executed. At times, the state of the register blocks may require data to be redistributed between the blocks to improve utilization and/or avoid resource hangs. Two types of situations require a redistribution; block fullness (one block is full while others are not), and fragmentation (when the ½n-bit entries are distributed such that n-bit writes are not possible). The rebalancing does not handle the case where all register blocks are full, since there are no free resources to redistribute, and the core must wait for instructions to complete and release register block tags, i.e., deallocate the registers, before dispatch can resume.

Figure 2:
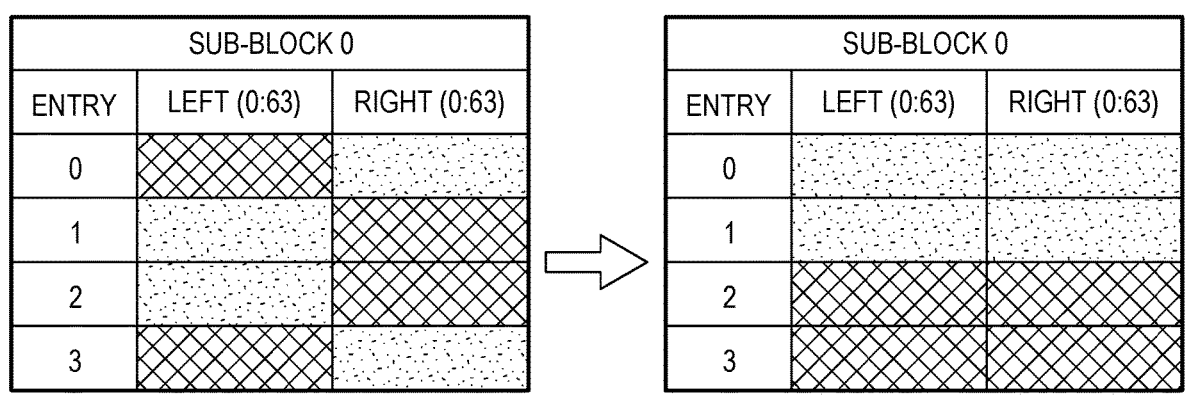
FIG. 2 is an example of defragmenting a register block, in accordance with an embodiment of the present invention.

One example case where defragmenting becomes necessary is when Vector-Scalar Registers (VSRs) require a full n-bit register tag pair in which to write data that must be in an even/odd register tag pair (i.e., two adjacent ½n-bit register halves). The processor core contains a register mapping table, or mapper, which is used for register renaming. The mapper will attempt to avoid this condition through register tag assignments, but it is possible that a register sub-block may become fragmented to such an extreme that no VSRs can be written, causing a potential hang. An example of this case is shown in FIG. 2, and explained below. The mapper will have the ability to defragment the register tags in a sub-block to allow VSRs to be assigned to that sub-block. This is different from a normal register block full condition, since the rebalance will be within the same sub-block rather than moving from one sub-block to another. The procedure is similar to the register full rebalance, except that the destination and source register tag sub-block will be the same.

The second case where redistribution is required is register block fullness. In a typical processor microarchitecture, each register sub-block is assigned to certain execution units. During normal processor operation, a sub-block may become full, preventing any other instructions of that type from being dispatched to that execution unit. To prevent these dispatch stalls, the mapper will attempt to balance register tags across the different sub-blocks. The mapper does this by identifying when a sub-block reaches a certain fullness threshold and then moving register tags from this sub-block to another less full sub-block. This is done on register entries whose producer instruction has already completed. Since these instructions have completed, they no longer need access to the register sub-block write ports and can therefore be moved to any other sub-block (i.e., the instruction is no longer assigned to a particular execution unit, and can therefore be moved from that particular sub-block). In addition, since these instructions have completed the registers are now considered architected, and therefore will not be flushed by the mapper, making the rebalance non-speculative. Move instructions will be issued to the execution units that will source a register tag from one sub-block and write it to another sub-block.

Figure 1:
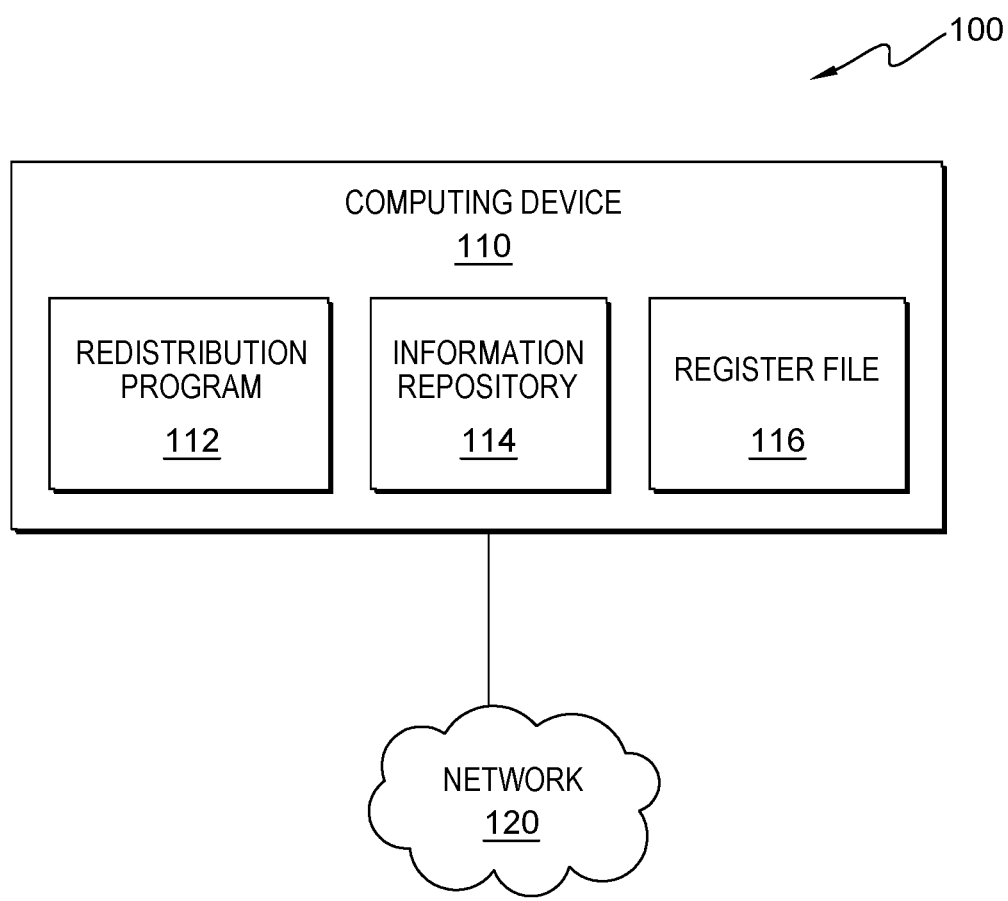
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of redistribution program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes redistribution program 112. In an embodiment, redistribution program 112 is a program, application, or subprogram of a larger program for dynamic redistribution of register files. In an alternative embodiment, redistribution program 112 may be located on any other device accessible by computing device 110 via network 120.

In an embodiment, computing device 110 includes information repository 114. In an embodiment, information repository 114 may be managed by redistribution program 112. In an alternate embodiment, information repository 114 may be managed by the operating system of the device, alone, or together with, redistribution program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, processor configuration data, user data, system configuration data, system default data, and other data that is received by redistribution program 112 from one or more sources, and data that is created by redistribution program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

In an embodiment, computing device 110 includes register file 116. In an embodiment, register file 116 is a bank of n-bit registers that can hold either a single n-bit value or two ½n-bit values. In an embodiment, register file 116 may contain one or more blocks of registers. In an embodiment, each block of registers may contain one or more sub-blocks. In an embodiment, a register mapping table, or mapper, translates logical registers into physical registers for each register of an instruction. The mapper also keeps track of whether each physical register in the core is available or is assigned, which is stored in a register free list. In an embodiment, the register free list is a list of all of the registers in the core, and each register is indicated with a single bit that is '0' for available and '1' for in use. The mapper uses the register free list to keep track of register locations in the register file that have been assigned through allocation and freed through deallocation. In an embodiment, if the instruction produces a result, the register mapping table is updated with a new register from the register free list maintained by the mapper.

One example of a register file is the Slice-Target register File (STF) found in certain processor microarchitectures. The STF consists of one or more banks of 128-bit registers, where each register can hold either a single 128-bit value or two 64-bit values. The STF typically organizes the register file as one or more blocks of registers, and each block typically contains one or more sub-blocks. In this STF example, a mapper keeps track of the assignment of virtual register names to physical registers.

FIG. 2 is an example of the defragmentation process of redistribution program 112. This is an example of a sub-block within a register file, e.g., register file 116 of FIG. 1. This sub-block contains four 128-bit registers. In this example, Sub-Block 0 is fragmented, with one 64-bit value stored in one half of each 128-bit location, with the other 64-bit half free, leaving no locations available for 128-bit data. Therefore, redistribution program 112 will relocate data from two of the 64-bit halves to the free halves of the other two 64-bit entries. This frees up two 128-bit locations for the mapper to assign to 128-bit data.

Figure 3:
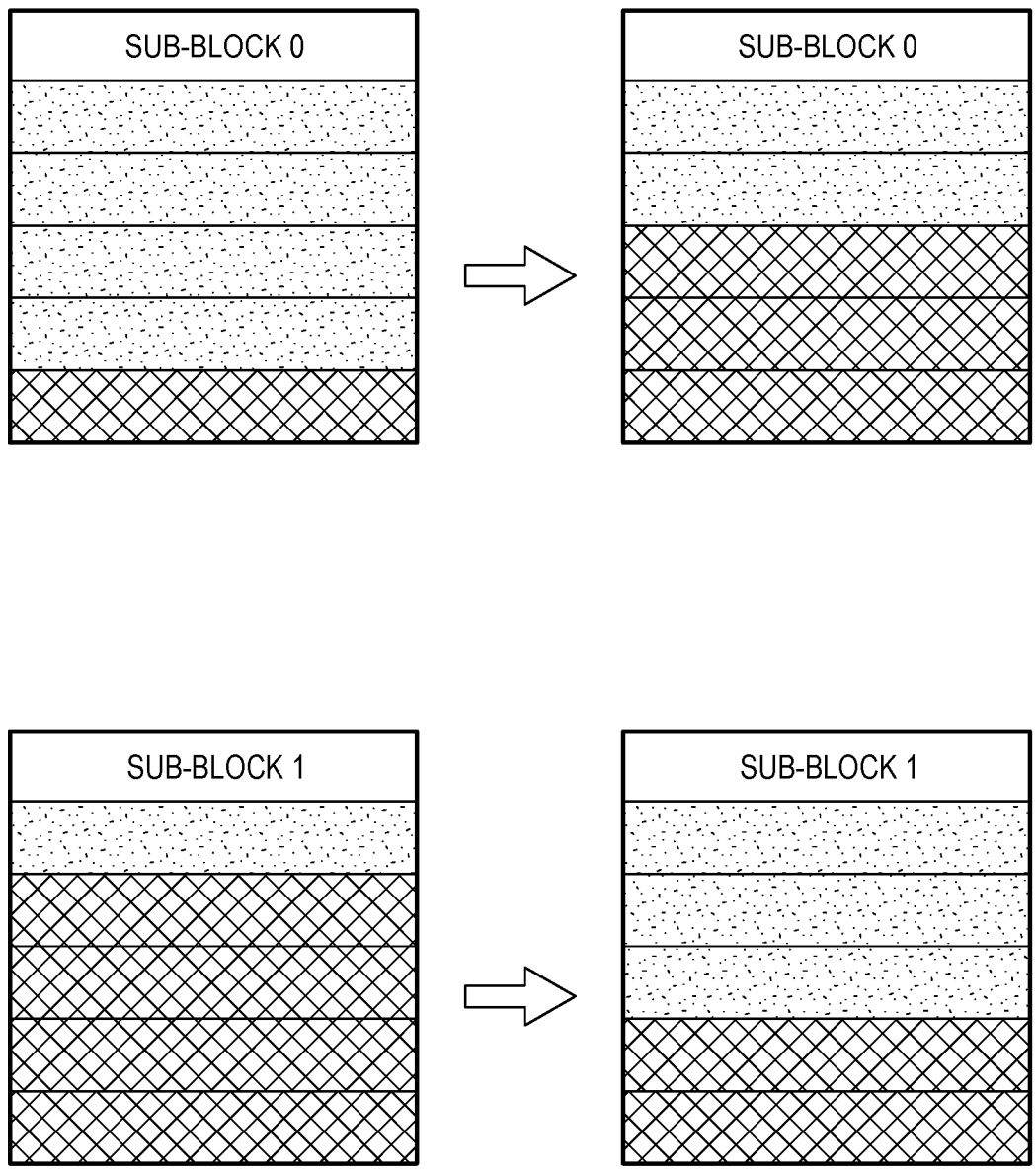
FIG. 3 is an example of rebalancing a register block, in accordance with an embodiment of the present invention.

FIG. 3 is an example of the rebalancing process of redistribution program 112. This is an example of two sub-blocks within a register file, e.g., register file 116 of FIG. 1. These two sub-blocks each contains five registers. In this example, Sub-Block 0 is almost full, and has reached the preset fullness threshold. Sub-Block 1, however, is nearly empty. Therefore, redistribution program 112 will relocate data from Sub-Block 0 to Sub-Block 1, and update the architected register data in the mapper to reflect the new location. In an embodiment, redistribution program 112 will only relocate data from architected registers, i.e., registers where the producer instruction has already completed, to avoid corrupting any instructions that have not yet completed.

Figure 4:
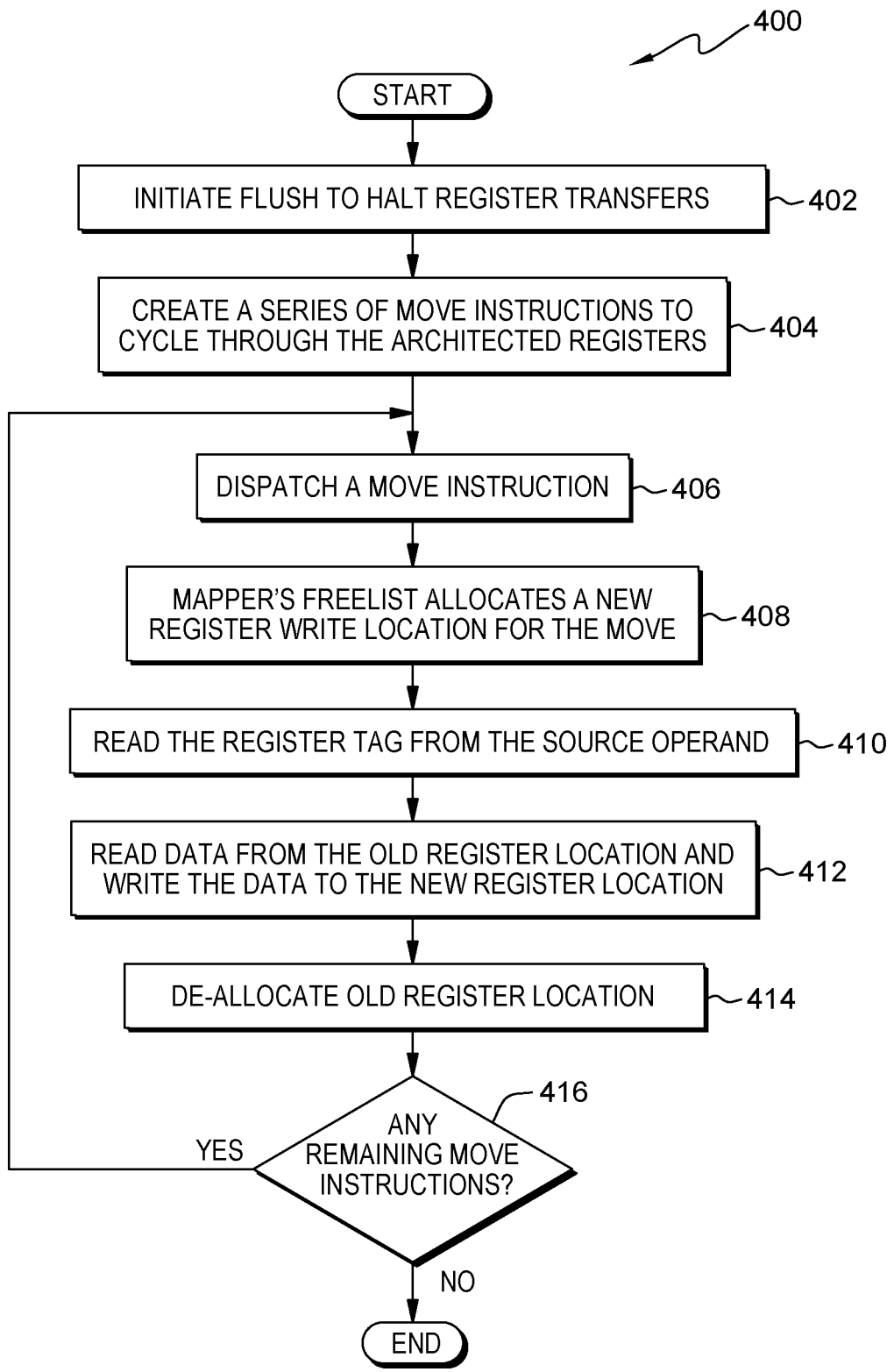
FIG. 4 is a flowchart depicting the operational steps of the register move process performed by the redistribution program, within the distributed data processing environment of FIG. 1, in accordance with an embodiment of the present invention.

FIG. 4 is a flow chart diagram of workflow 400 depicting operational steps of the register move process performed by redistribution program 112. In an alternative embodiment, the steps of workflow 400 may be performed by any other program while working with redistribution program 112. Redistribution program 112 provides two major parts of functionality, defragmenting and rebalancing. The register move process is used by both the defragmenting procedure and the rebalancing procedure. The register move process is repeated each time redistribution program 112 determines that either a defragmentation or a rebalance is needed.

In an embodiment, to determine if a defragmentation is needed, the first step is to count the number of register entries that are fragmented. The count is every entry that has one half register in use (left or right) and the other half register is free. For the example in FIG. 2, the count would be four, since each of the four 128-bit entries are populated by a single 64-bit value. The count provides a value between 0 and the maximum number of registers. A threshold is set to a value which determines whether the count is high enough to initiate a block defragmentation. This threshold value may be a system default, or may be pre-selected at runtime by a user. In the example of FIG. 2, if the threshold is 3, then redistribution program 112 will perform a defragmentation, since the count in this example is 4.

When the defragmentation process begins, the register mapper will attempt to defragment all entries. Since the overhead of starting the move process is large it will complete all moves possible to prevent more possible defragments in the future.

The defragmentation process is accomplished by executing a series of "move" instructions to allow the execution units to read the register locations that it wants to move data away from and write that piece of data into a new/desired register location. The register move process performed by redistribution program 112 is detailed below in workflow 400.

In an embodiment, to determine if a rebalance is needed, the mapper will generate a usage count for each sub-block. The usage count can include the number of register halves or the number of register pairs (full size registers) used in each sub-block based on the register free list of registers in the mapper. This provides a count between 0 to the maximum number of entries in the register file, e.g., register file 116 of FIG. 1. There will be one usage count per sub-block, and the mapper will initiate a rebalance based on the usage count exceeding a fullness threshold. This threshold may be a system default, or may be pre-selected at runtime by a user. This rebalance will also be based on the fullness of a sub-block relative to the other sub-blocks. In an embodiment, redistribution program 112 will only initiate a rebalance if there is a sub-block with a low enough usage count, i.e., the usage count is less than an emptiness threshold. In the example illustrated in FIG. 3, sub-block 0 is 80% full, while sub-block 1 is only 20% full. In this example, if the threshold is 60/30, i.e., one sub-block is at least 60% full while another sub-block is only 30% or less full, then redistribution program 112 performs a rebalance. In another example with the same threshold, if one sub-block was 90% full and all others were 100% full then there will not be any attempt to rebalance. This fullness threshold may be a system default, or may be pre-selected at runtime by a user. In another embodiment, redistribution program 112 performs a rebalance when triggered by an instruction executed by the processor. In yet another embodiment, redistribution program 112 performs a rebalance when triggered by a mode switch in the processor core. In some embodiments, redistribution program 112 performs a rebalance when microarchitectural events occur. For example, a processor stall or hang may trigger a rebalance.

In an embodiment, redistribution program 112 uses the mapper to select which entries from the near-full sub-block to move and which destination sub-block entries to move them to. In an embodiment, redistribution program 112 also decides the number of entries to move. In an embodiment, redistribution program 112 will select two sub-blocks and move entries between them to balance the usage count. In an embodiment, redistribution program 112 selects the highest utilized sub-block and the lowest utilized sub-block to be balanced.

The register rebalance process is accomplished by executing a series of "move" instructions to allow the execution units to read the register locations that it wants to move data away from and write that piece of data into a new/desired register location. The register move process performed by redistribution program 112 is detailed below in workflow 400.

In an embodiment, redistribution program 112 initiates a flush to halt register transfers. In an embodiment, redistribution program 112 creates a series of move instructions to cycle through the architected registers. In an embodiment, redistribution program 112 dispatches a move instruction. In an embodiment, redistribution program 112 allocates a new register write location from the register free list for the move. In an embodiment, redistribution program 112 reads the register tag from the source operand. In an embodiment, redistribution program 112 reads data from the old register location and writes the data to the new register location. In an embodiment, redistribution program 112 de-allocates the old register location. In an embodiment, redistribution program 112 determines if there are any remaining move instructions.

It should be appreciated that embodiments of the present invention provide at least for the register move process performed by redistribution program 112. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 4 illustrates one possible iteration of the register move process performed by redistribution program 112, which repeats each time redistribution program 112 determines that either a defragmentation or a rebalancing is necessary.

Redistribution program 112 initiates a flush to halt register transfers (step 402). In an embodiment, redistribution program 112 initiates a flush up to the oldest instruction in the machine which has not completed. Therefore, all older instructions have completed and are architected. Once all the instructions younger than, and including, the oldest instruction in the machine which has not completed are flushed, there is no possibility for an instruction to be corrupted by the movement of data by redistribution program 112. In an example microarchitecture, this instruction is called the Next to Complete tag pointer.

Redistribution program 112 creates a series of move instructions to cycle through the architected registers (step 404). In an embodiment, redistribution program 112 creates a series of move instructions to read data from the old register location to the new register location. The move instructions will have the architected register to be read in the source operand field, and the destination register is the same as the architected register of the source. In this way, the architected register is moved to a different physical location in the register array, and the mapper architected register entry is updated with the new register file tag.

Redistribution program 112 dispatches a move instruction (step 406). In an embodiment, redistribution program 112 dispatches one of the move instructions created in step 404 to the execution unit to perform the actual data movement.

Redistribution program 112 allocates a new register write location from the mapper free list for the move (step 408). In an embodiment, redistribution program 112 uses the free list in the register mapper to allocate a new register location to write the data from the architected register. The mapper uses the free list to keep track of register locations in the register file that have been assigned through allocation and freed through deallocation.

Redistribution program 112 reads the register tag from the source operand (step 410). In an embodiment, redistribution program 112 reads the register tag from the source operand field in the move instructions to determine the architected register that is to be moved. The register tag was previously written into the source operand field in step 404.

Redistribution program 112 reads data from the old register location and writes the data to the new register location (step 412). In an embodiment, redistribution program 112 uses the execution unit to read the data using the source tag to index into the register file and write the data into the new location that was allocated in step 408.

Redistribution program 112 de-allocates the old register location (step 414). In an embodiment, after the move instruction completes, redistribution program 112 deallocates the register location that the architected register occupied prior to the move and updates the instruction pointer for the oldest instruction that has not yet completed. In an embodiment, redistribution program 112 deallocates the register location by updating the table in the mapper. In an example microarchitecture, this table is called the Instruction Completion Table.

Redistribution program 112 determines if there are any remaining move instructions (decision block 416). In an embodiment, redistribution program 112 determines if there are any remaining move instructions to complete. If redistribution program 112 determines that there are remaining move instructions ("yes" branch, decision block 416), redistribution program 112 returns to step 406 to dispatch the next move instruction. If redistribution program 112 determines that there are no remaining move instructions ("no" branch, decision block 416), then redistribution program 112 ends for this cycle.

Figure 5:
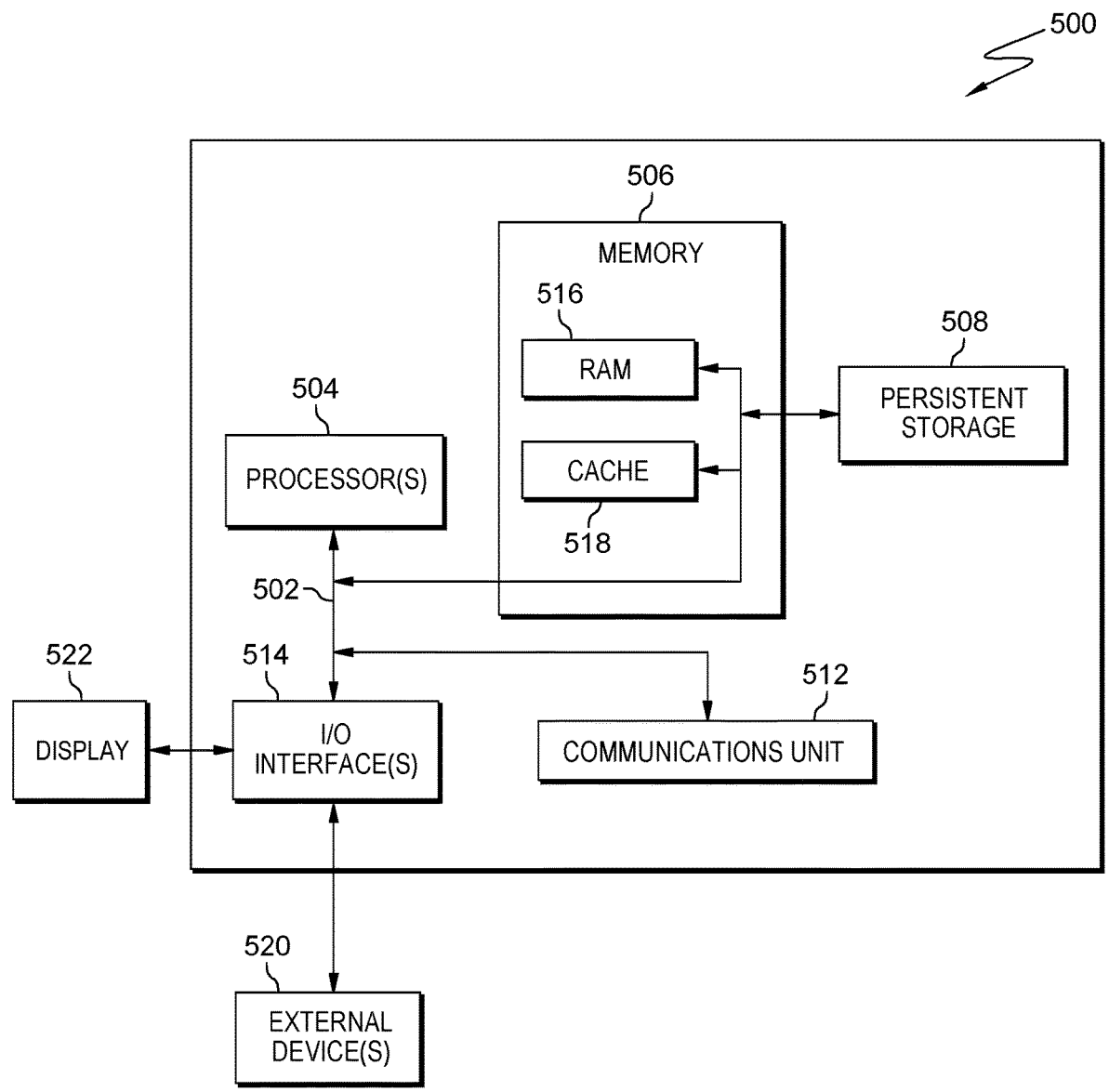
FIG. 5 depicts a block diagram of components of the computing devices executing the redistribution program within the distributed data processing environment of FIG. 1, in accordance with an embodiment of the present invention.

FIG. 5 is a block diagram depicting components of computing device 110 suitable for redistribution program 112, in accordance with at least one embodiment of the invention. FIG. 5 displays the computer 500, one or more processor(s) 504 (including one or more computer processors), a communications fabric 502, a memory 506 including, a random-access memory (RAM) 516, and a cache 518, a persistent storage 508, a communications unit 512, I/O interfaces 514, a display 522, and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and input/output (I/O) interface(s) 514. The communications fabric 502 may be implemented with an architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a RAM 516 and a cache 518. In general, the memory 506 can include any suitable volatile or non-volatile computer readable storage media. Cache 518 is a fast memory that enhances the performance of processor(s) 504 by holding recently accessed data, and near recently accessed data, from RAM 516.

Program instructions for redistribution program 112 may be stored in the persistent storage 508, or more generally, any computer readable storage media, for execution by one or more of the respective computer processors 504 via one or more memories of the memory 506. The persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. In the context of some embodiments of the present invention, the source of the various input data may be physically remote to the computer 500 such that the input data may be received, and the output similarly transmitted via the communications unit 512.

The I/O interface(s) 514 allows for input and output of data with other devices that may be connected to computer 500. For example, the I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present invention, e.g., redistribution program 112, can be stored on such portable computer readable storage media and can be loaded onto persistent storage 508 via the I/O interface(s) 514. I/O interface(s) 514 also connect to a display 522.

Display 522 provides a mechanism to display data to a user and may be, for example, a computer monitor. Display 522 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for dynamic redistribution of register files, the computer-implemented method comprising:
   determining, by one or more computer processors, if a redistribution of one or more register files is necessary;
   responsive to determining that the redistribution of the one or more register files is necessary, flushing, by the one or more computer processors, one or more register file transfers which have not yet completed;
   allocating, by the one or more computer processors, one or more write locations based on a register free list, wherein one write location is allocated for each architected register of one or more architected registers to be redistributed;
   reading, by the one or more computer processors, a source data from each architected register of the one or more architected registers; and
   writing, by the one or more computer processors, the source data to the one or more write locations.

2. The computer-implemented method of claim 1, wherein determining that the redistribution of the one or more register files is necessary further comprises:
   determining, by the one or more computer processors, a number of fragmented registers for the one or more register files, wherein a register is fragmented when one-half of the register is in use and one-half of the register is free; and
   responsive to determining that the number of fragmented registers for the one or more register files exceeds a threshold, initiating, by the one or more computer processors, the redistribution of the one or more register files.

3. The computer-implemented method of claim 1, wherein determining that the redistribution of the one or more register files is necessary further comprises:
   determining, by the one or more computer processors, a usage count for each sub-block of one or more sub-blocks of the one or more register files; and
   responsive to determining that the usage count for one or more full sub-blocks for the one or more register files exceeds a first threshold and the usage count for one or more empty sub-blocks for the one or more register files is less than a second threshold, initiating, by the one or more computer processors, the redistribution of the one or more register files, wherein the first threshold is a minimum usage count of one or more registers in the full sub-blocks, and further wherein the second threshold is a maximum usage count of one or more registers in the empty sub-blocks.

4. The computer-implemented method of claim 1, wherein responsive to determining that the redistribution of the one or more register files is necessary, flushing the one or more register file transfers which have not yet completed further comprises:
   determining, by the one or more computer processors, a time of issue of an oldest register file transfer of the one or more register file transfers that have not yet completed; and
   flushing, by the one or more computer processors, each register file transfer of the one or more register file transfers which have not yet completed that were issued since the time of issue of the oldest register file transfer.

5. The computer-implemented method of claim 1, wherein writing the source data to the one or more write locations further comprises the source data and the write locations are in a same sub-block of one or more sub-blocks of the one or more register files.

6. The computer-implemented method of claim 3, wherein determining the usage count for each sub-block of one or more sub-blocks of the one or more register files further comprises selecting two sub-blocks of one or more sub-blocks to balance the usage count between the two sub-blocks.

7. The computer-implemented method of claim 3, wherein determining the usage count for each sub-block of one or more sub-blocks of the one or more register files further comprises selecting a highest utilized sub-block and a lowest utilized sub-block for the redistribution.

8. A computer program product for dynamic redistribution of register files, the computer program product comprising one or more computer readable storage media and program instructions stored on the one or more computer readable storage media, the program instructions including instructions to:
   determine if a redistribution of one or more register files is necessary;
   responsive to determining that the redistribution of the one or more register files is necessary, flush one or more register file transfers which have not yet completed;
   allocate one or more register file write locations based on a register free list, wherein one write location is allocated for each architected register of one or more architected registers to be redistributed;
   read a source data from each architected register of the one or more architected registers; and
   write the source data to the one or more write locations.

9. The computer program product of claim 8, wherein determining that the redistribution of the one or more register files is necessary further comprises one or more of the following program instructions, stored on the one or more computer readable storage media, to:
   determine a number of fragmented registers for the one or more register files, wherein a register is fragmented when one-half of the register is in use and one-half of the register is free; and
   responsive to determining that the number of fragmented registers for the one or more register files exceeds a threshold, initiate the redistribution of the one or more register files.

10. The computer program product of claim 8, wherein determining that the redistribution of the one or more register files is necessary further comprises one or more of the following program instructions, stored on the one or more computer readable storage media, to:
    determine a usage count for each sub-block of one or more sub-blocks of the one or more register files; and
    responsive to determining that the usage count for one or more full sub-blocks for the one or more register files exceeds a first threshold and the usage count for one or more empty sub-blocks for the one or more register files is less than a second threshold, initiate the redistribution of the one or more register files, wherein the first threshold is a minimum usage count of one or more registers in the full sub-blocks, and further wherein the second threshold is a maximum usage count of one or more registers in the empty sub-blocks.

11. The computer program product of claim 8, wherein responsive to determining that the redistribution of the one or more register files is necessary, flushing the one or more register file transfers which have not yet completed further comprises one or more of the following program instructions, stored on the one or more computer readable storage media, to:
- determine a time of issue of an oldest register file transfer of the one or more register file transfers that have not yet completed; and
- flush each register file transfer of the one or more register file transfers which have not yet completed that were issued since the time of issue of the oldest register file transfer.

12. The computer program product of claim 8, wherein writing the source data to the one or more write locations further comprises the source data and the write locations are in a same sub-block of one or more sub-blocks of the one or more register files.

13. The computer program product of claim 10, wherein determining the usage count for each sub-block of one or more sub-blocks of the one or more register files further comprises selecting two sub-blocks of one or more sub-blocks to balance the usage count between the two sub-blocks.

14. The computer program product of claim 10, wherein determining the usage count for each sub-block of one or more sub-blocks of the one or more register files further comprises selecting a highest utilized sub-block and a lowest utilized sub-block for the redistribution.

15. A computer system for dynamic redistribution of register files, the computer system comprising:
- one or more computer processors;
- one or more computer readable storage media; and
- program instructions stored on the one or more computer readable storage media for execution by at least one of the one or more computer processors, the stored program instructions including instructions to:
- determine if a redistribution of one or more register files is necessary;
- responsive to determining that the redistribution of the one or more register files is necessary, flush one or more register file transfers which have not yet completed;
- allocate one or more write locations based on a register free list, wherein one write location is allocated for each architected register of one or more architected registers to be redistributed;
- read a source data from each architected register of the one or more architected registers; and
- write the source data to the one or more write locations.

16. The computer system of claim 15, wherein determining that the redistribution of the one or more register files is necessary further comprises one or more of the following program instructions, stored on the one or more computer readable storage media, to:
- determine a number of fragmented registers for the one or more register files, wherein a register is fragmented when one-half of the register is in use and one-half of the register is free; and
- responsive to determining that the number of fragmented registers for the one or more register files exceeds a threshold, initiate the redistribution of the one or more register files.

17. The computer system of claim 15, wherein determining that the redistribution of the one or more register files is necessary further comprises one or more of the following program instructions, stored on the one or more computer readable storage media, to:
- determine a usage count for each sub-block of one or more sub-blocks of the one or more register files; and
- responsive to determining that the usage count for one or more full sub-blocks for the one or more register files exceeds a first threshold and the usage count for one or more empty sub-blocks for the one or more register files is less than a second threshold, initiate the redistribution of the one or more register files, wherein the first threshold is a minimum usage count of one or more registers in the full sub-blocks, and further wherein the second threshold is a maximum usage count of one or more registers in the empty sub-blocks.

18. The computer system of claim 15, wherein responsive to determining that the redistribution of the one or more register files is necessary, flushing the one or more register file transfers which have not yet completed further comprises one or more of the following program instructions, stored on the one or more computer readable storage media, to:
- determine a time of issue of an oldest register file transfer of the one or more register file transfers that have not yet completed; and
- flush each register file transfer of the one or more register file transfers which have not yet completed that were issued since the time of issue of the oldest register file transfer.

19. The computer system of claim 15, wherein writing the source data to the one or more write locations further comprises the source data and the write locations are in a same sub-block of one or more sub-blocks of the one or more register files.

20. The computer system of claim 17, wherein determining the usage count for each sub-block of one or more sub-blocks of the one or more register files further comprises selecting two sub-blocks of one or more sub-blocks to balance the usage count between the two sub-blocks.

\* \* \* \* \*